United States Patent [19]
Kaneko et al.

[11] Patent Number: 5,428,201
[45] Date of Patent: Jun. 27, 1995

[54] METHOD AND APPARATUS FOR CONTROLLING ELECTRIC DISCHARGE MACHINING

[75] Inventors: Yuji Kaneko, Sakai; Shinji Ito, Kaga; Ichiro Araie; Koji Shu, both of Sakai, all of Japan

[73] Assignee: Sodick Co., Ltd., Yokohama, Japan

[21] Appl. No.: 161,165

[22] Filed: Dec. 3, 1993

[30] Foreign Application Priority Data

Dec. 3, 1992 [JP] Japan .................. 4-356602

[51] Int. Cl.⁶ .................. B23H 1/02; B23H 7/18; B23H 7/20; G06F 19/00
[52] U.S. Cl. .................. 219/69.16; 219/69.13; 395/61; 395/904
[58] Field of Search ............... 219/69.13, 69.16, 69.17, 219/69.18; 364/474.04; 395/61, 904, 900

[56] References Cited

U.S. PATENT DOCUMENTS

| | | | |
|---|---|---|---|
| 5,117,083 | 5/1992 | Kawamura | 219/69.16 |
| 5,200,905 | 4/1993 | Uemoto et al. | 219/69.13 |
| 5,216,218 | 6/1993 | Sasaki | 219/69.16 |
| 5,267,141 | 11/1993 | Morita et al. | 364/152 |

FOREIGN PATENT DOCUMENTS

| | | | |
|---|---|---|---|
| 548516 | 6/1993 | European Pat. Off. | 219/69.16 |
| 63-200918 | 8/1988 | Japan | 219/69.13 |
| 2131838 | 5/1990 | Japan | |
| 2212042 | 8/1990 | Japan | |
| 4-57619 | 2/1992 | Japan | 219/69.16 |

*Primary Examiner*—Geoffrey S. Evans
*Attorney, Agent, or Firm*—Marks & Murase

[57] ABSTRACT

A method of and apparatus for controlling electric discharge machining in which a machining gap formed between a tool electrode and a workpiece is maintained at an essentially constant size based on a reference servo-feed voltage, and in which a jump action, for moving a tool electrode up and away from a workpiece, and returning it to a position close to the workpiece is controlled. The reference servo-feed voltage and conditions for jump action are optimally set to required values during machining according to the discharge stability. The discharge stability is obtained by comparing the actual values of characteristics required for specifying gap condition, e.g., waiting time for a discharge to occur, the voltage during the waiting time, discharge frequency, to the corresponding theoretical values. The theoretical values are calculated in part according to given machining conditions. Therefore, even when machining conditions change as machining progresses, jump action and servo-feed action are properly controlled.

28 Claims, 10 Drawing Sheets

METHOD AND APPARATUS FOR CONTROLLING ELECTRIC DISCHARGE MACHINING

FIELD OF THE INVENTION

The present invention generally relates to a method and apparatus for controlling machining conditions according to change of gap condition detected at a machining gap formed between a tool electrode and a workpiece and, more particularly, to a method and apparatus for controlling conditions for performing electrode servo-feed action and electrode jump action.

BACKGROUND OF THE INVENTION

In general, during electric discharge machining, an electrical discharge induced by a machining pulse between a workpiece and an electrode, results in the removal of a small crater of material from the workpiece. Electric discharge machining is performed by the application of a plurality of electrical discharges in a highly repetitive manner. The spacing between the tool electrode and the workpiece, called the machining gap, is typically on the order of a few microns or tens of microns in size and is typically filled with a dielectric machining liquid, such as water or kerosene. The machining gap may be maintained at a generally constant size by comparing mean gap voltage detected at the gap during machining to a reference servo-feed voltage, and using the comparison result to control machining conditions.

During machining, a machining pulse having an ON state and OFF state under predetermined machining conditions is generated, which in turn produces a current pulse having a nearly constant peak current value and constant pulse width. When preparing to machine, the operator sets machining conditions such as the on-time and off-time of the machining pulses applied across the gap, the peak current value, detection levels for detecting unstable machining, as well as other parameters in accordance with requirements such as the machining area of the workpiece, the machining depth, the dimensional accuracy required, and the surface roughness desired. As machining progresses, the operator may regulate the reference servo-feed voltage. Further, based on his experience or by referring to recommended data table, the operator may regulate a jump cycle and a jump stroke of tool electrode jump action, whereby the electrode is moved up and away from the workpiece and then immediately returned down to a position close to the workpiece, to thereby create a pumping action in order to remove particles produced during machining from the gap. It is known that such particles may result in a decreased material removal rate if left in the gap.

Conditions such as reference servo-feed voltage, the jump cycle and the jump stroke must be regulated so that the conflicting requirements of a high material removal rate and stable discharge machining are effectively balanced. For example, if the jump cycle is shortened and the jump stroke increased, while the stability of discharge will be improved, the material removal rate will be decreased. Therefore, fairly good skill is required on the part of the operator to properly regulate conditions during machining. For example, a skilled operator may observe such conditions as discharge frequency, the waiting time for discharges, i.e., the time during which no discharge occurs even though voltage has been applied across the machining gap, the voltage during the waiting time for discharge and the occurrence of short-circuiting, all by referring to waveforms of the gap voltage using an oscilloscope.

U.S. Pat. No. 5,117,083 issued to Kawamura discloses a jump control system for controlling jump action conditions using a so-called "fuzzy" inference control instead of the intuition and experience of the skilled operator. In this disclosure, in order to control a jump cycle and a jump stroke, the stability of the discharges and the rate of change are inferred based on given fuzzy rules according to detected gap conditions such as the waiting time for discharge, the gap voltage during the waiting time, and the mean voltage.

However, in order to decide whether gap conditions are good or bad, values representative of the gap condition are compared to respective given reference values, which in turn are electrically detected by detecting means. Since reference values must be changed according to changes in the machining conditions, many reference values are set in advance.

SUMMARY OF THE INVENTION

An object of the present invention is to provide a method and apparatus for controlling electric discharge machining in which even nonskilled operators can optimally control electrode servo-feed action and jump action.

It is another object of the present invention to provide a method and apparatus for controlling electric discharge machining in which optimal control of electrode servo-feed action and jump action can be realized even when machining conditions change.

Additional objects and advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and the other objects, and in accordance with the purpose of the present invention, as embodied and broadly described herein, a method for controlling electric discharge machining is provided in which a machining gap is maintained at an essentially constant distance based on a reference servo-feed voltage, and/or jump action, which involves moving a tool electrode up and away from a workpiece and then returning the tool electrode down to a position close to the workpiece is controlled. The method comprises the steps of calculating theoretical values of characteristics required for specifying gap condition, e.g., waiting time for discharge, voltage during the waiting time, and discharge frequency, in accordance with predetermined machining conditions; determining actual values of the characteristics according to detected conditions at the gap; determining discharge stability in response to the theoretical values and the actual values; and setting the reference servo-feed voltage and/or conditions for jump action to optimum values in response to the discharge stability.

In addition, according to the present invention, an apparatus for controlling electric discharge machining is provided, including a power pulse generator for applying a voltage pulse across a gap formed between a tool electrode and a workpiece to machine the workpiece, a servo-feed controller for maintaining an essentially constant gap size based on a reference servo-feed voltage and a jump controller for controlling, based on given electrode jump condition, a jump action whereby the electrode is moved up and away from the workpiece and immediately returned down to a position close to the workpiece. The apparatus comprises a setting device for setting machining conditions such as the on-time and off-time of the machining pulses, the peak current value, the reference servo-feed voltage and no-load voltage, a first calculator for determining theoretical values of characteristics required for specifying gap condition, e.g., the waiting time for a discharge, voltage during the waiting time, and discharge frequency, according to the machining conditions supplied from the setting device. The apparatus further comprises a detector for detecting gap conditions and producing data representative of detected gap condition, a second calculator for determining actual values of the characteristics in response to the detector, and a stability index calculator for determining discharge stability in response to theoretical values from the first calculator and actual values from the second calculator, and for producing a discharge stability signal representative of the discharge stability. According to the discharge stability signal from the stability index calculator, optimum values of the reference servo-feed voltage and the jump conditions are set.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE PREFERRED EMBODIMENTS

Reference will now be made in detail to a preferred embodiment of the invention, an example of which is illustrated in the accompanying drawings.

Figure 1:
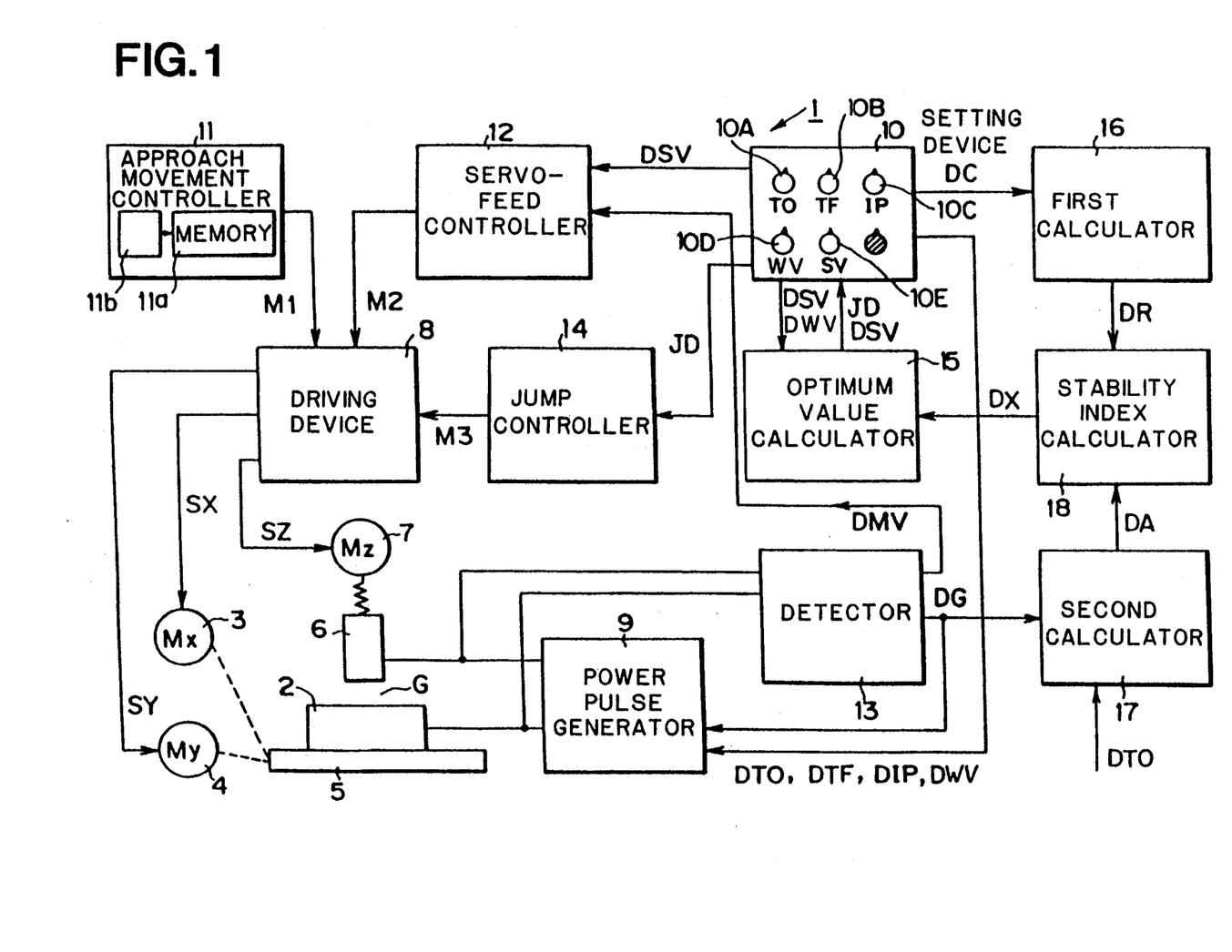
FIG. 1 illustrates a block diagram of an embodiment of the present invention.

Turning first to FIG. 1, there is depicted a die-sinking electric discharge machining apparatus 1 equipped with a control device for electric discharge machining which includes a workpiece provided on a X-Y movement table 5 and a tool electrode 6 attached to an electrode holder (not illustrated) and positioned, during machining, to oppose a workpiece 2 across a machining gap G. An X-axis servomotor 3 and a Y-axis servomotor 4 move the X-Y movement table 5 to position the workpiece 2 in the X-Y plane in which the table 5 moves. Further, a Z-axis servomotor 7 may be provided to move the tool electrode 6 in a Z-axis direction, i.e., perpendicular to the X-Y plane. A driving device 8 produces drive signals SX, SY and SZ to control the rotation of the X-, Y- and Z-axis servomotors 3, 4 and 7, respectively.

A power pulse generator 9 supplies machining pulses for machining the workpiece 2 across the gap G, based on preset machining conditions, i.e., data such as DTO, DTF, DIP and DWV received from a setting device 10, as explained below.

The setting device 10 for setting machining conditions may preferably include, for example, switches 10A, 10B, 10C, 10D and 10E. When an operator, by using the appropriate settings, sets the discharge pulse on-time TO, the discharge pulse off-time TF, the peak current value IP, the no-load voltage WV, and reference servo-feed voltage SV to values selected according to machining requirements, the setting device 10 produces the set value data DTO, DTF, DIP, DWV and DSV, which represent the set values of the parameters TO, TF, IP, WV and SV, respectively.

An approach movement controller 11 for imparting a relative approach movement between the tool electrode 6 and the workpiece 2 in the X-Y plane may include, for example, a memory 11a and an input device 11b. The input device 11b is used for inputting data such as representative dimensions of and the configuration of the workpiece 2, a pattern of approach movement, a distance of approach movement, and the like, which are transmitted and stored in the memory 11a. The above data may be sent to the memory 11a from any external device. Based on the above data, the approach movement controller 11 supplies a first command signal M1 to the driving device 8, which produces driving signals SX and SY for controlling respective servomotors 3 and 4 according to the first command signal M1.

A servo-feed controller 12 receives the data DSV representative of set value SV of reference servo-feed voltage from the setting device 10 and data DMV representative of mean voltage MV from a detector 13, and supplies a second command signal M2 to the driving device 8 based on data DSV and DMV. The driving device 8 produces driving signal SZ for controlling servomotor 7 according to the second command signal M2 so that the gap G can be maintained at an optimum distance.

A jump controller 14 causes the electrode 6 to perform a jump action as necessary to remove particles produced during machining from the gap G. The jump controller 14 receives data JD, representative of values for defining a jump cycle and a jump stroke, through the setting device 10 from an optimum value calculator 15, and supplies third command signal M3 to the driving device 8 according to the data JD. The driving device 8 produces driving signal SZ in response to the third command signal M3 giving priority to the third command signal M3 over the second command signal M2.

The die-sinking electric discharge machining apparatus 1 further comprises first calculator 16, second calculator 17 and stability index calculator 18 to determine the discharge stability in response to conditions detected at the gap G during machining and to produce a discharge stability signal DX representative of the discharge stability. The first calculator 16 determines theoretical values based on the group of data DC, representative of set machining conditions, received from the setting device 10, and transmits theoretical value data DR, representative the theoretical values, to the stability index calculator 18. The second calculator 17 determines actual values based on the group of data DG representative of the conditions detected at the gap G as received from the detector 13, and transmits actual value data DA, representative of the actual values, to the stability index calculator 18. Based on the theoretical data values DR and the actual data values DA, the stability index calculator 18 produces a discharge stability signal DX representative of stability of discharges at the gap in the manner detailed below.

Figure 2:
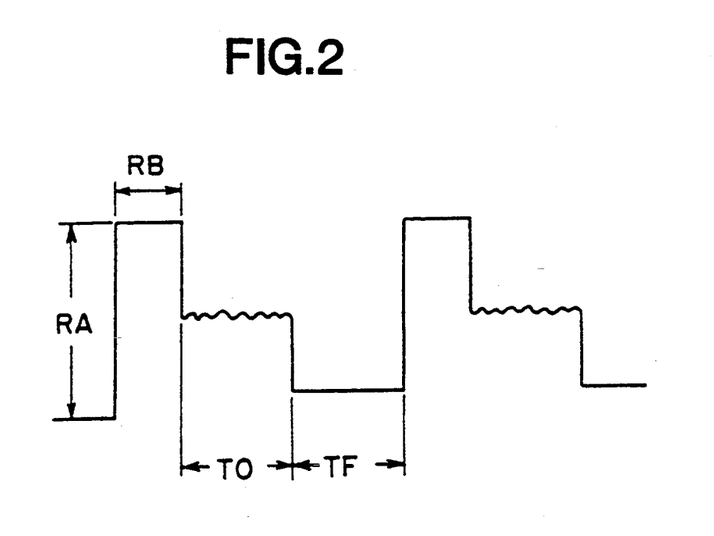
FIG. 2 is a waveform of gap voltage for describing theoretical values to be found in a first calculator.

The setting device 10 transmits the data DC, consisting of DTO, DTF, DWV and DSV, to the first calculator 16 which, based on the data DC, determines the following theoretical values (A) to (C) (which will be described with reference to the waveform of gap voltage (FIG. 2)):

(A) The theoretical value of RA which corresponds to the gap voltage during the waiting time, which is the interval between the instant a voltage is applied across the gap G and until discharge is initiated (hereinafter referred to as "waiting time voltage").

The value of RA is theoretically equal to the no-load voltage WV.

(B) The theoretical value of RB which corresponds to the discharge waiting time.

The value of RB may be obtained using the following relationship, provided that the voltage is at least 30 volts during the on-time TO (i.e., the time during which discharge is maintained with current through the gap G):

$$RB = \{TO \times (SV - 30) + TF \times SV\}/(WV - SV)$$

(C) The theoretical value of RC which corresponds to the discharge frequency.

The value of RC may be obtained using the following relationship:

$$RC = 1/(RB + TO + TF)$$

The first calculator 16 transmits the theoretical data values RA, RB and RC, representative of the above-described respective theoretical values, to the stability index calculator 18.

EXAMPLE 1

Assuming the discharge pulse on-time TO, the discharge pulse off-time TF, the no-load voltage WV and the reference servo-feed voltage SV are set to the following values:

On-time TO = 120 μsec

Off-time TF = 20 μsec

No-load voltage WV = 200 V

Servo reference voltage SV = 70 V, then the theoretical values of RA, RB and RC may be given as follows:
Theoretical waiting time voltage RA = 200 V
Theoretical waiting time RB = approx. 48 μsec
Theoretical discharge frequency RC = approx. 5319 Hz In the case of Example 1, gap conditions may be evaluated, for example, by using the above theoretical values, and deciding whether the actual waiting time of discharge is shorter or longer than the theoretical value of 48 μsec (approximately). In general, if the actual waiting time is shorter than the theoretical value of 48 μsec (approximately), it is indicative of a bad condition at the gap G.

EXAMPLE 2

Assuming the discharge pulse on-time TO, the discharge pulse off-time TF, the no-load voltage WV and the reference servo-feed voltage SV are set to the following values:

On-time TO = 240 μsec

Off-time TF = 30 μsec

No-load voltage WV = 280 V

Servo reference voltage SV = 90 V, then the theoretical values of RA, RB and RC may be given as follows:
Theoretical waiting time voltage RA = 280 V
Theoretical waiting time RB = approx. 90 μsec
Theoretical discharge frequency RC = approx. 2778 Hz In the case of Example 2, if the actual waiting time is 48 μsec, which was the proper, i.e., theoretical, value in the case of Example 1, it would, in this case, indicate an extremely bad condition at the gap G.

Each time even one of machining conditions is changed, the system decides whether the actual value of a given parameter is larger or smaller than a given reference value, and whether the corresponding reference value should be changed. In such a system, a large number of reference values associated with different possible machining conditions must be prepared. Also, when employing fuzzy inference techniques in the stability index calculator 18, a large number of fuzzy rules and membership functions associated with machining conditions must be prepared. This requires a large memory capacity for storing the many reference values and/or rules required, and results in complicated calculations. The present invention solves these problems in the manner described below.

The detector 13 detects the actual number of discharges PN and total waiting time TT during a given detecting period SP, and the mean gap voltage MV in response to voltage signal at the gap G, and then produces data DG representative of the detected values. The power pulse generator 9 controls the supply of machining pulses, for example, by increasing or decreasing the pulse off-time according to data DG received from the detector 13. There is no need to describe this well-known method of controlling the power pulse generator 9 in detail.

The second calculator 17 determines, based on data DG received from the detector 13 and set data DTO received from the setting device 10, the following values (a) through (c):

(a) The actual value of ALV corresponding to waiting time voltage per pulse.

The value ALV is obtained using the following relationship (provided that the voltage during the on-time TO is at least 30 volts).

$$ALV = \{SP \times MV - 30 \times PN \times TO\}/(TT \times PN)$$

(b) The actual value of AT corresponding to the discharge waiting time per pulse.

The value of AT is obtained using the following relationship:

$$AT = TT/PN$$

(c) The actual value of AF corresponding to the discharge frequency.

The value of AF is obtained using the following relationship:

$$AF = PN \times K1,$$

where K1 is a coefficient determined according to the detecting period SP.

The actual value data DA, representative of the above actual values (a) to (c), is input to the stability index calculator 18.

Figure 3:
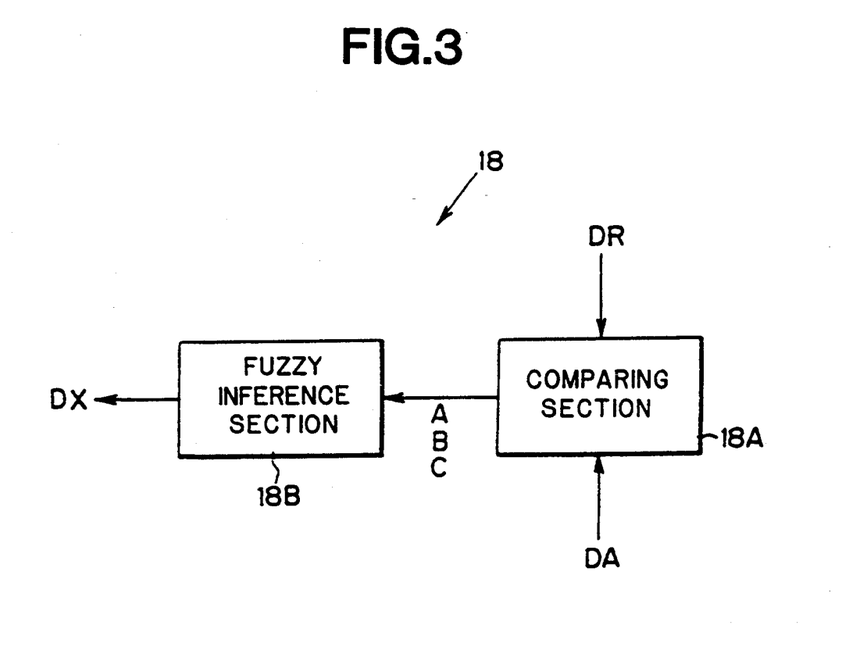
FIG. 3 is a block diagram showing an example of the stability index calculator shown in FIG. 1.

FIG. 3 illustrates an embodiment of the stability index calculator 18 which comprises a comparing section 18A and a fuzzy inference section 18B. In this embodiment, the comparing section 18A compares the content of the actual value data DA with the content of the theoretical value data DR and calculates, from the theoretical values associated with selected characteristics of gap condition, i.e., waiting time voltage, discharge waiting time, and discharge frequency, the following deviation ratios:

Deviation ratio of waiting time voltage
A = ALV/RA

Deviation ratio of waiting time B = AT/RB

Deviation ratio of discharge frequency C = AF/RC

Figure 4:
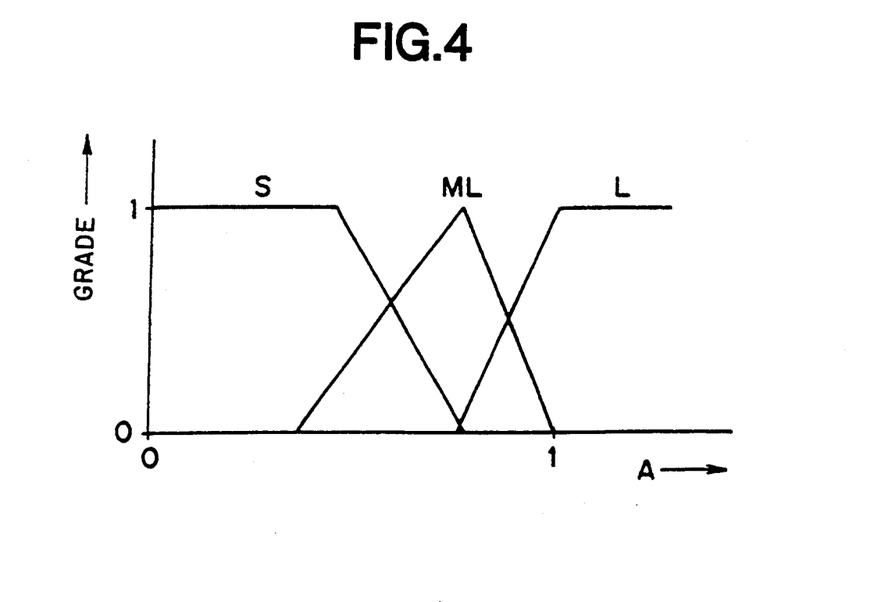
FIG. 4 illustrates an example of a membership function used in the fuzzy inference section of the stability index calculator of FIG. 3.
Figure 5:
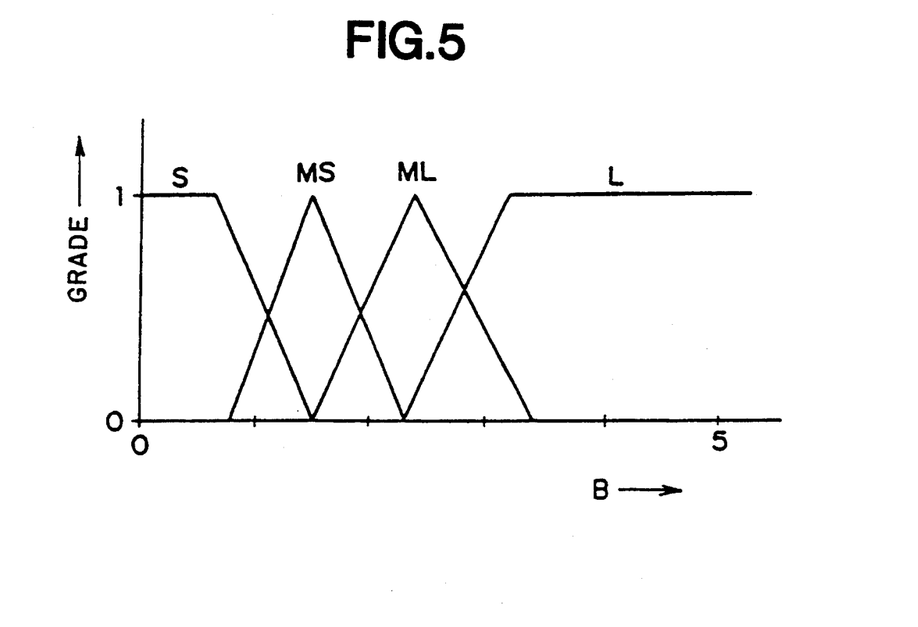
FIG. 5 illustrates an example of a membership function used in the fuzzy inference section of the stability index calculator of FIG. 3.
Figure 6:
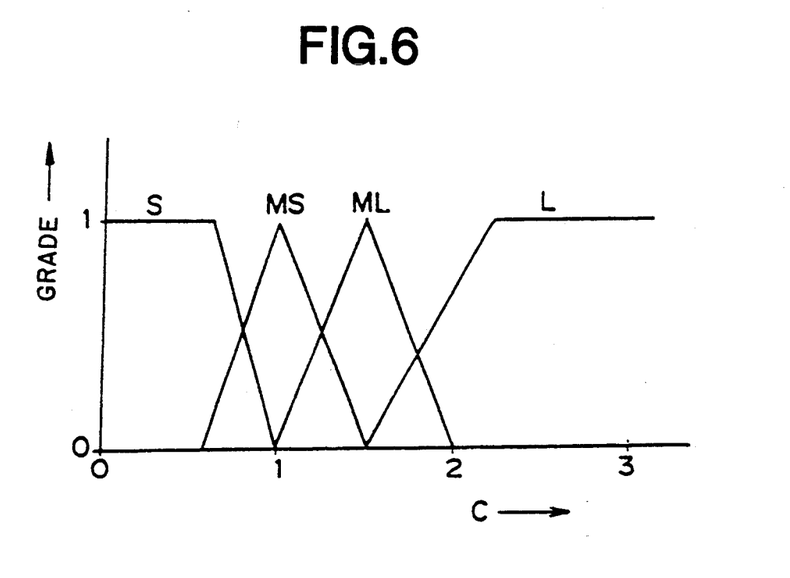
FIG. 6 illustrates an example of a membership function used in the fuzzy inference section of the stability index calculator of FIG. 3.
Figure 7:
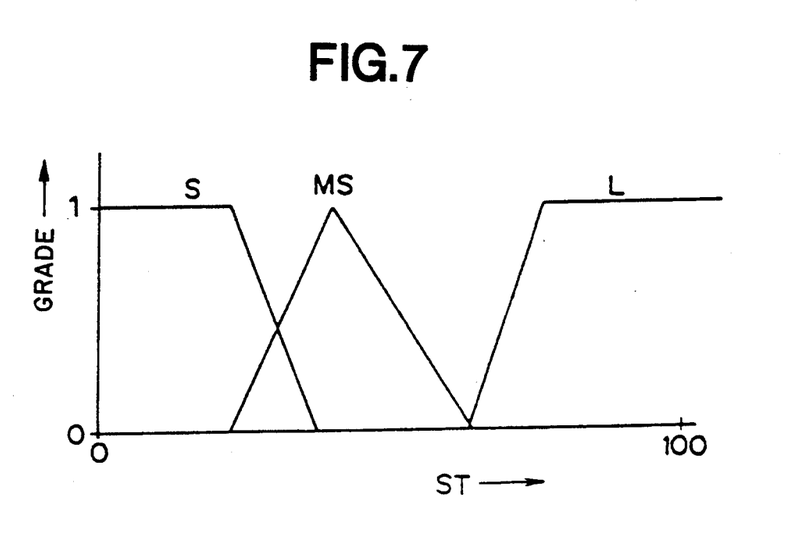
FIG. 7 illustrates an example of a membership function used in the fuzzy inference section of the stability index calculator of FIG. 3.

Then, these deviation ratios A, B and C are supplied to the fuzzy inference section 18B, which infers the discharge stability ST using fuzzy inference techniques based on the following fuzzy production rules (1) to (11) (for specifying the relationship between the deviation ratios and discharge stability ST) and produces a discharge stability signal DX:

Rule (1) If AL, then ST=L
Rule (2) If A=ML, then ST=MS
Rule (3) If AS=S, then ST=S
Rule (4) If B=L, then ST=S
Rule (5) If B=ML, then ST=MS
Rule (6) If B=MS, then ST=L
Rule (7) If B=S, then ST=S
Rule (8) If C=L, then ST=S
Rule (9) If C=ML, then ST=MS
Rule (10) If C=MS, then ST=L
Rule (11) If C=S, then ST=S wherein:
L means Large
ML means Medium Large
MS means Medium Small
S means Small In this embodiment, the membership functions shown in FIGS. 4, 5 and 6 are provided according to the "If" part of the fuzzy production rules, and the membership function shown in FIG. 7 is provided according to the "then" part of the fuzzy production rules.

An example of fuzzy inference for inferring the discharge stability ST in response to the deviation ratio A will be now described with reference to FIGS. 4 and 7, and fuzzy production rules (1) to (3). By using membership functions comprising fuzzy sets A=S, A=ML and A=L, as shown in FIG. 4, respective membership grades are obtained. Then, based on fuzzy production rules (1) to (3), the membership functions comprising fuzzy sets ST=L, ST=MS and ST=S, as shown in FIG. 7 are modified by applying the obtained membership grades to the related membership functions. In general, the modification is made by cutting off an upper part of a fuzzy set above the obtained membership grade. After all the modifications based on fuzzy production rules (1) to (3) are accomplished, the modified fuzzy sets are unified. Then, a "defuzzification" is done by calculating the center of gravity of the unified fuzzy set, based upon which the discharge stability ST associated with the deviation ratio A may be inferred.

Similarly, the stabilities ST associated with the deviation ratios B and C may be inferred. The stability index calculator 18 simply determines a mean value of the inferred stabilities ST and produces the discharge stability signal DX representative of the obtained mean value. Alternatively, a discharge stability signal DX representative of weighted mean value may be produced. The discharge stability signal DX is transmitted to an optimum value calculator 15, which outputs optimum values for controlling servo-feed action and jump action.

In the embodiment of FIG. 3, the comparing section 18A simply determines the deviation ratios between the theoretical values and the actual values associated with selected characteristics of the gap condition and then discharge stability is decided using fuzzy inference in the fuzzy inference section 18B according to the deviation ratios received from the comparing section 18A.

Figure 8:
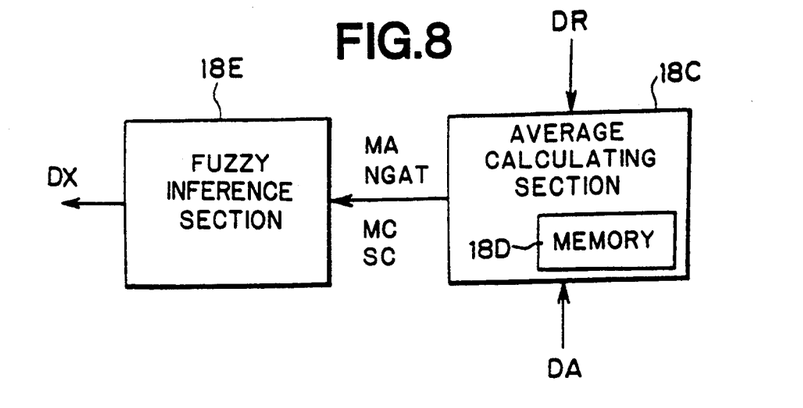
FIG. 8 is a block diagram showing another example of the stability index calculator shown in FIG. 1.
Figure 9:
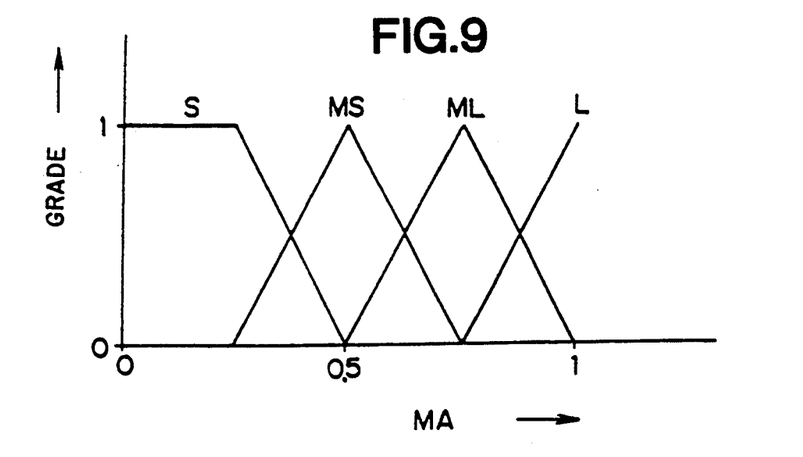
FIG. 9 illustrates an example of a membership function used in the fuzzy inference section of the stability index calculator of FIG. 8.
Figure 10:
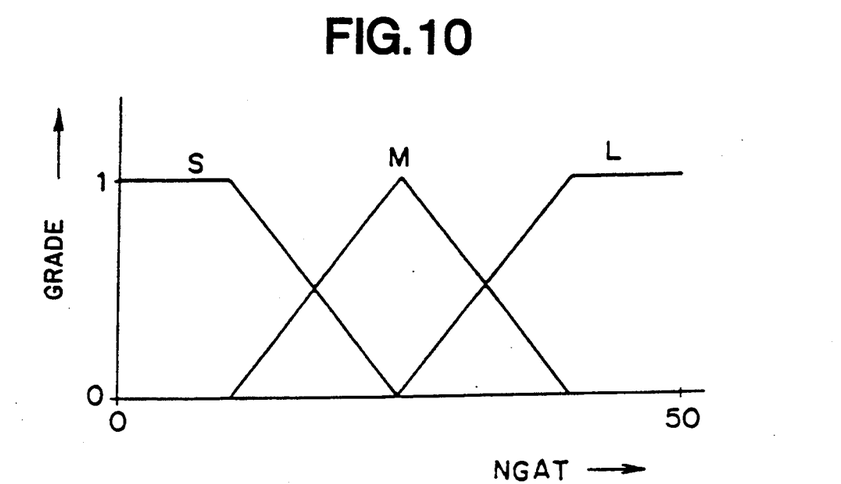
FIG. 10 illustrates an example of a membership function used in the fuzzy inference section of the stability index calculator of FIG. 8.
Figure 11:
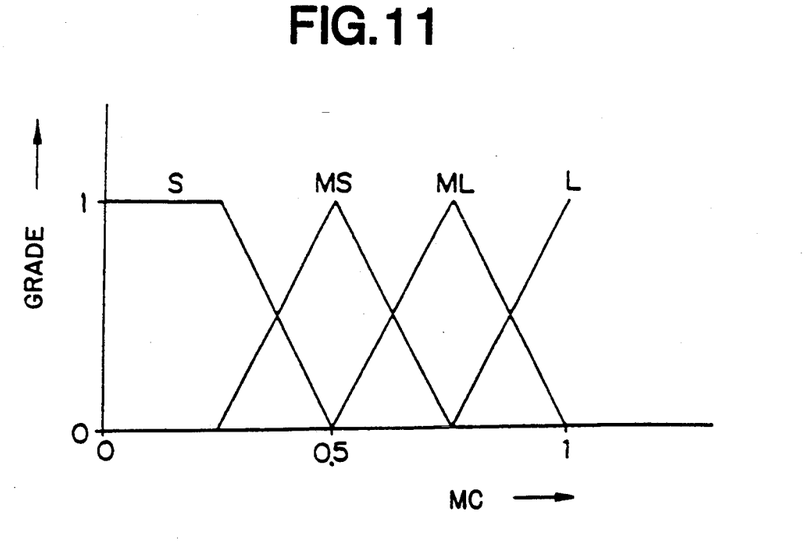
FIG. 11 illustrates an example of a membership function used in the fuzzy inference section of the stability index calculator of FIG. 8.
Figure 12:
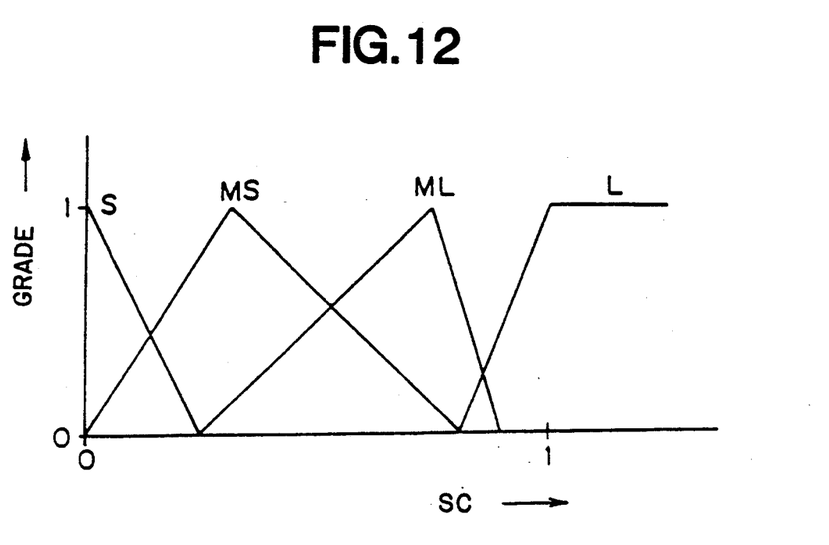
FIG. 12 illustrates an example of a membership function used in the fuzzy inference section of the stability index calculator of FIG. 8.

As shown in the embodiment of FIG. 8, the stability index calculator 18 may consist of an average calculating section 18C having a memory 18D, and a fuzzy inference section 18E.

The memory 18D receives the actual data DA from the second calculator 17 and stores the latest actual data DA (within a certain number of detecting periods SP). In this embodiment, the number of detecting periods SP may be set to an appropriate number, for example "50". The content of the data DA stored in the memory 18D is updated each time the memory 18D receives new data from the second calculator 17.

The average calculating section 18C reads out data stored in the memory 18D and determines the following values (1) through (4):

(1) The value of MA which is representative of a time average of the deviation ratio A within the past detecting period SP, in this example the number 50.

The value of MA is obtained using the following formula:

$$MA = \frac{\sum_{n=0}^{50} A(n)}{50}$$

(2) The value of NGAT, which is representative of the number of times the deviation ratio B is smaller than 0.1 within the past detecting period SP, in this example the number 50.

(3) The value of MC, which is representative of a time average of deviation ratio C within the past detecting period SP, in this example the number 50.

The value of MC is obtained using the following formula:

$$MC = \frac{\sum_{n=0}^{50} C(n)}{50}$$

(4) The value of SC, which is representative of standard deviation of value MC.

The value of SC is obtained using the following formula:

$$SC = \sqrt{\frac{\sum_{n=0}^{50} (C(n) - MC)^2}{50}}$$

Then, the values MA, NGAT, MC and SC are supplied to the fuzzy inference section 1BE, which infers the discharge stability ST using fuzzy inference techniques based on the following fuzzy production rules (a) to (o) (for specifying the relationship between the values MA, NGAT, MC and SC, and the discharge stability ST), and produces the discharge stability signal DX.

Rule (a) If MA=L, then ST=L
Rule (b) If MA=ML, then ST=MS
Rule (c) If MA=MS, then ST=S
Rule (d) If MA=S, then ST=S
Rule (e) If NGAT=L, then ST=S
Rule (f) If NGAT=M, then ST=MS
Rule (g) If NGAT=S, then ST=L
Rule (h) If MC=L, then ST=L
Rule (i) I f MC=ML, then ST=MS
Rule (j) If MC=MS, then ST=L
Rule (k) If MC=S, then ST=S
Rule (l) If SC=L, then ST=S
Rule (m) If SC=ML, then ST=MS
Rule (n) If SC=MS, then ST=L
Rule (o) If SC=S, then ST=S wherein:
L means Large
ML means Medium Large
M means Medium
MS means Medium Small
S means Small As described above with regard to the deviation ratios A, B and C, fuzzy inference for inferring the discharge stability ST in response to values MA, NGAT, MC and SC is executed in the fuzzy inference section 18E with reference to FIGS. 7, 8 and FIGS. 9 to 12. Then, the fuzzy inference section 1BE produces the discharge stability signal DX, which is transmitted to the optimum value calculator 15.

The optimum value calculator 15 may be realized using a conventional microcomputer which processes the stability index signal DX received from the discharge stability calculator 18 according to an optimum value program stored therein. The optimum value calculator 15 also receives the preset set value data DSV and DWV, indicative of reference servo-feed voltage SV and no-load voltage WV, respectively, from the setting device 10.

Figure 13:
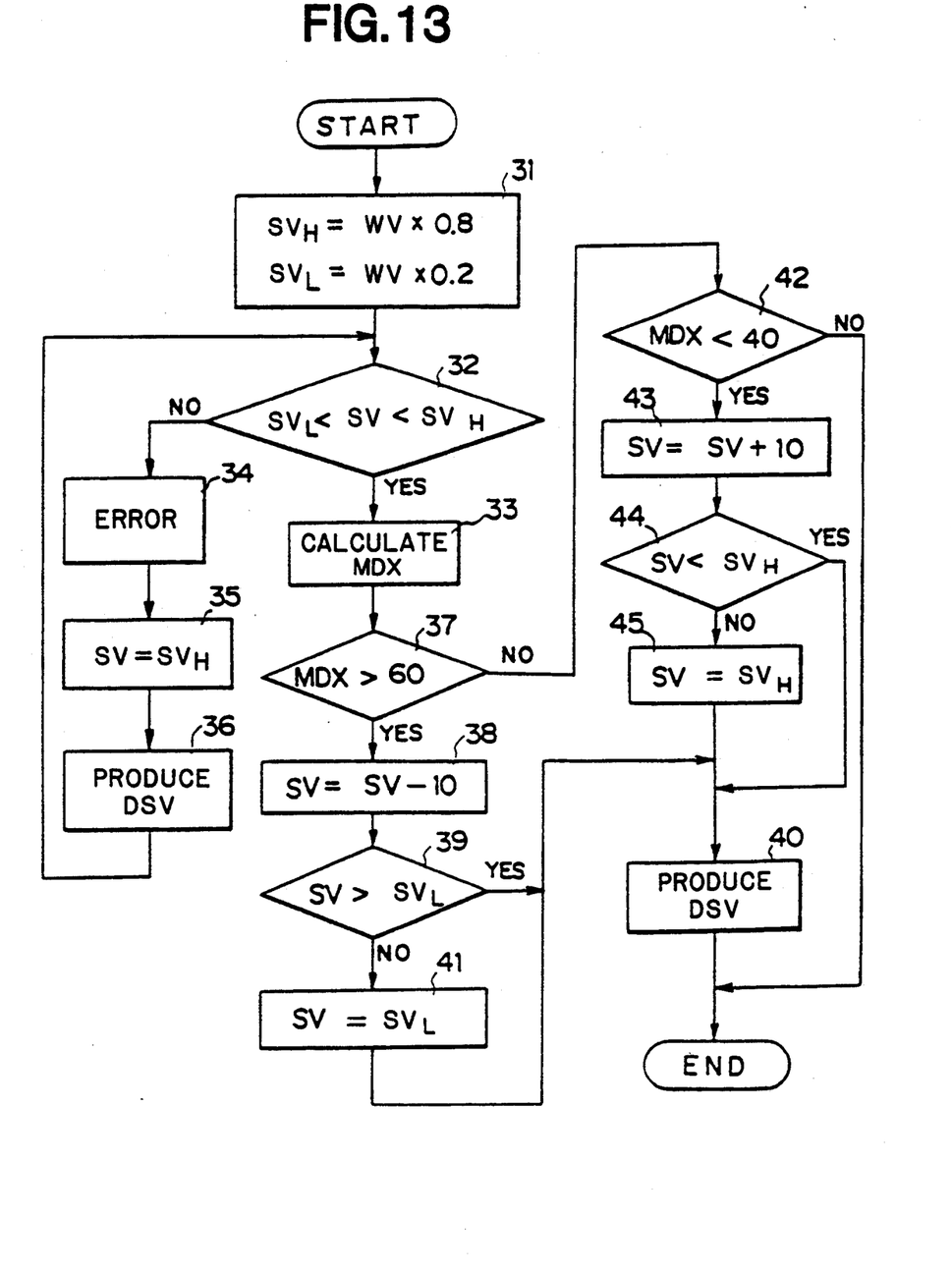
FIG. 13 is a flow chart illustrating a control program for the servo-feed controller shown in FIG. 1.

FIG. 13 is a flow chart showing an example of a first exemplary program for processing in order to generate optimum value of reference servo-feed voltage SV according to the discharge stability signal DX. Processing starts at a predetermined time interval. First, at step 31, an upper limit $SV_H$ and a lower limit $SVT_L$ of reference servo-feed voltage are calculated based on the set value data of no-load voltage DWV.

Next, at step 32, the preset set value of reference servo-feed voltage SV is compared to the upper limit $SV_H$, and the lower limit $SV_L$. If the preset set value SV is below the upper limit $SV_H$ and above the lower limit $SV_L$, processing proceeds to step 33. Otherwise, an error comment is produced at step 34 and processing proceeds to step 35.

At step 35, the preset set value SV is changed to the upper limit $S_H$, as an optimum value of reference servo-feed voltage. At step 36, data DSV (representative of the optimum value of reference servo-feed voltage) is transmitted to the setting device 10 and processing loops back to step 32. In response to data DSV, the setting device 10 resets the set value of reference servo-feed voltage SV to the value corresponding to data DSV. For this purpose, the setting device 10 may, for example, comprise a register in which an initial value set by means of the switch 10E can be stored and reset in response to data DSV from the optimum value calculator 15.

At step 33, a certain number of values, for example 100, corresponding to the discharge stability signal DX, are continuously received and averaged, and the mean value MDX is obtained. Next, at step 37, the mean value MDX is compared to a reference value, for example, a value of 60, and if the mean value MDX is greater than 60, processing proceeds to step 38 and the preset set value SV is decreased by 10. At step 39, the decreased value SV is compared to the lower limit $SV_L$, and if the decreased value SV is greater than the lower limit $SV_L$, at step 40 data DSV representative of the decreased value SV is transmitted to the setting device 10 and the processing ends.

If, at step 39 it is determined that the decreased value SV is equal to or less than the lower limit $SV_L$, processing proceeds to step 41, wherein the value SV is changed to the lower limit $SV_L$ as an optimum value of reference servo-feed voltage. Next, at step 40, data DSV representative of the changed value of reference servo-feed voltage SV is produced and processing ends.

If, at step 37, the mean value MDX is equal to or less than the exemplary value of 60, processing proceeds to step 42. If at step 42 it is determined that the mean value MDX is equal to or more than a certain number, for example 40, then it is determined that it is not necessary to change the preset set value SV and processing ends. Otherwise, if the mean value MDX is less than 40, then at step 43 the preset set value SV is increased by 10. Next, at step 44, the increased value SV is compared to the upper limit $SV_H$ and, if the increased value SV is determined to be less than the upper limit $SV_H$, then, at step 40, data DSV representative of the increased value SV is produced as an optimum value of reference servo-feed voltage, and processing ends. Otherwise, if the increased value SV is determined to be equal to or more than the upper limit $SV_H$, processing proceeds to step 45, wherein the value SV is changed to the upper limit $SV_H$ as an optimum value of reference servo-feed voltage. Next, at step 40, data DSV representative of the changed value of reference servo-feed voltage SV is produced and processing ends.

Instead of the above optimum value calculating method, an optimum value of reference servo-feed voltage SV may be calculated according to the discharge stability signal DX using other flow logic. In any event, data DSV, representative of reset value of reference servo-feed voltage SV in the setting device 10, is transmitted to the servo-feed controller 12, which controls the servo-feed action in the Z-axis direction according to the new data value for DSV.

Figure 14:
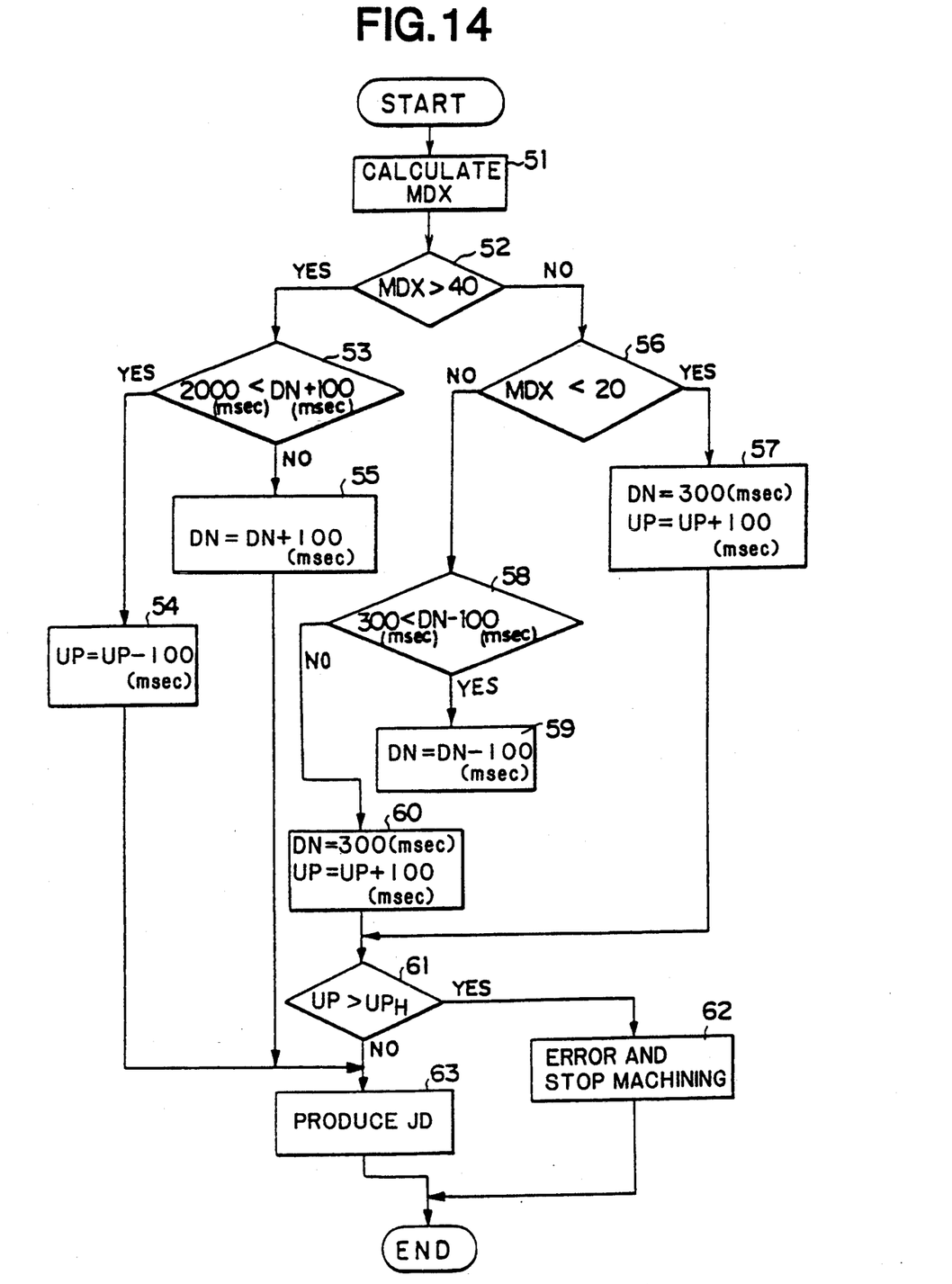
FIG. 14 is a flow chart illustrating a control program for the jump controller shown in FIG. 1.
Figure 15:
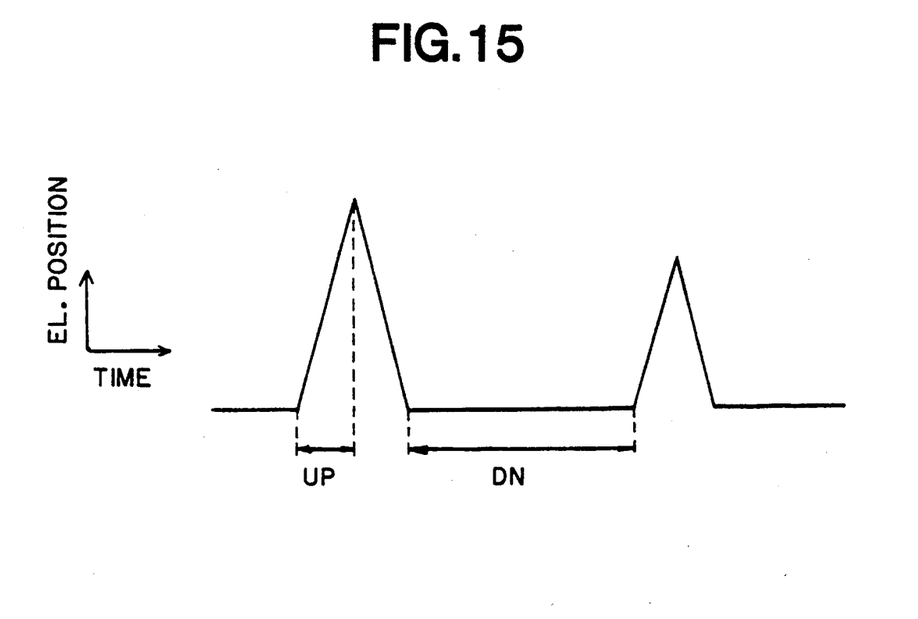
FIG. 15 illustrates movement of a tool electrode during a jump action.

FIG. 14 is a flow chart illustrating an example of second flow logic for generating optimum values for controlling jump action according to the discharge stability signal DX. In this embodiment of FIG. 14, a value of the time during which the electrode 6 is being raised, time UP, a value for defining a jump stroke, is calculated. Further, a value representative of time during which the electrode 6 is in a position close to the workpiece 2, time DN, is calculated. FIG. 15 depicts the position of electrode as a function of time to graphically illustrate time UP and time DN.

Processing starts at a predetermined time interval. First, at step 51, a certain number, for example 100 data values corresponding to the discharge stability signal DX are continuously received and averaged and the mean value MDX is obtained.

Next, at step 52, the mean value MDX is compared to a reference value, for example, a value of 40 msec. If the mean value MDX is greater than 40 msec, processing proceeds to step 53. At step 53, the value DN plus 100, for example, is compared to an upper limit for the time DN, for example 2000 msec, and, if the value DN plus 100 is greater than 2000 msec, at step 54, the value UP is decreased by 100 msec. Then, at step 63, control data for decreasing the rising time UP, JD, is produced and processing ends. If at step 53, the value DN plus 100 msec is equal to or less than 2000 msec, at step 55, the value of DN is increased by 100 msec and at step 63 the control data for increasing the time DN, JD, is produced and processing ends.

If at step 52, the mean value MDX is determined to be less than 40, then, at step 56, the mean value MDX is further compared to a reference value, for example 20. If the mean value MDX is determined to be less than 20, the value DN is changed to 300 msec and, at step 57, the value UP is increased by 100 msec. Then, at step 61, the increased value of UP is compared to an upper limit $UP_H$. If the increased value UP exceeds the upper limit $UP_H$, an error comment is produced and machining is halted. Otherwise at step 63, wherein the control data JD for changing the time DN to 300 msec and for increasing the rising time UP by 100 msec, is produced and processing ends.

If, at step 56, the mean value MDX is determined to be equal to or greater than 20, then, at step 58, the value DN minus 100 msec is compared to an lower limit for time DN, for example 300 msec. If the value DN minus 100 msec is determined to be equal to or greater than 300 msec, then, at step 60, the value DN is changed to 300 msec, and the value UP is increased by 100 msec. Then, processing proceeds to step 61. If, at step 58, the value DN minus 100 msec is determined to be less than 300 msec, then, at step 59, the value DN is decreased by 100 msec and processing proceeds to step 61.

The control data JD is transmitted to the setting device 10, which supplies the control data JD to the jump controller 14, whereby jump action is controlled with optimum values of time UP and time DN. Instead of the above optimum value determination method, an optimum value for controlling a jump action may be determined according to the discharge stability signal DX employing other logic.

In the above embodiment, fuzzy inference is used for obtaining the discharge stability signal DX. Alternatively, a neural network may be used.

Figure 16:
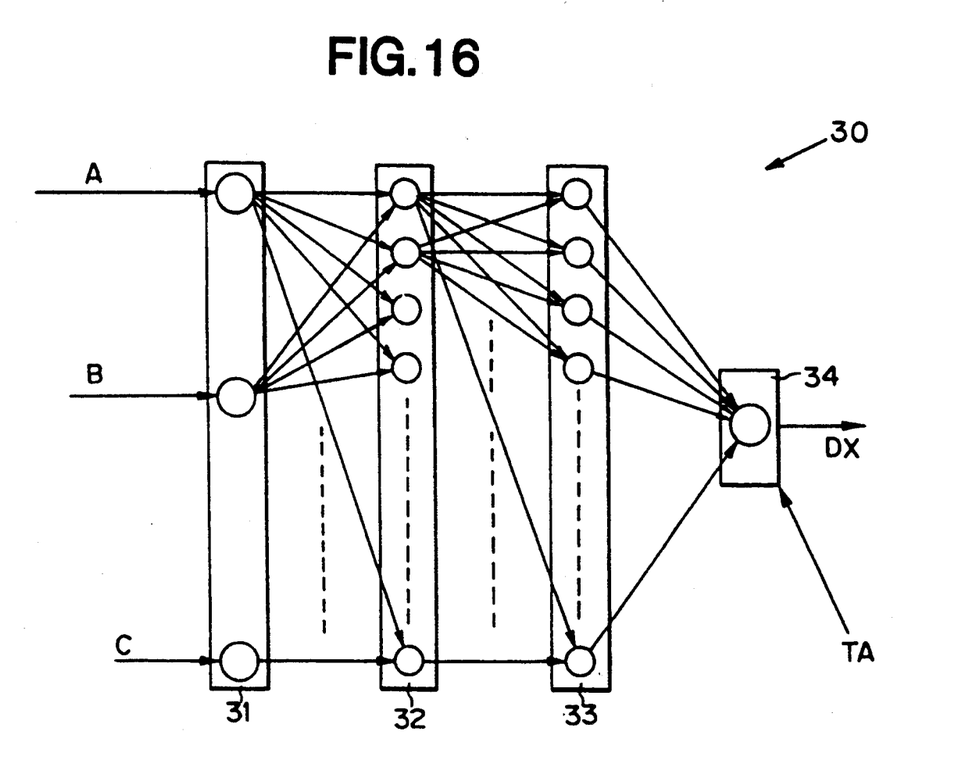
FIG. 16 illustrates an example of neural network system applicable for determining the discharge stability signal in lieu of the inference section shown in FIG. 3.

FIG. 16 illustrates an exemplary model of a neural network which may be used instead of the fuzzy inference section 18B shown in FIG. 3. In FIG. 16, a neural network 30 comprises an input stratum 31, a first intermediate stratum 32, a second intermediate stratum 33 and an output stratum 34, all of which are independent of each other, and each of which can receive signals only from a preceding stratum. Circles illustrated in each stratums indicates neurons, all of which execute nonlinear signal processing. An arrow between neurons illustrates a bond having a weight, i.e., a bonding strength, which can be adaptively changed by learning.

Signals representative of the deviation ratios A, B and C from the comparing section 18A are received, as input patterns, at the input stratum 31, and then are adaptively changed through pattern mapping in each of the stratums to produce, as an output pattern from the output stratum 34, the discharge stability signal DX. A proper teaching signal TA is supplied to the output stratum 34. Upon receipt of the teaching signal TA, the bonding strengths between neurons in the neural network 30 are adaptively changed so that the output pattern at the output stratum 34 will correspond to the received teaching signal TA. The fuzzy inference section 18E may be used for producing the teaching signal TA. The discharge stability signal DX at the output stratum 34 is transmitted to the optimum value calculator 15.

Figure 17:
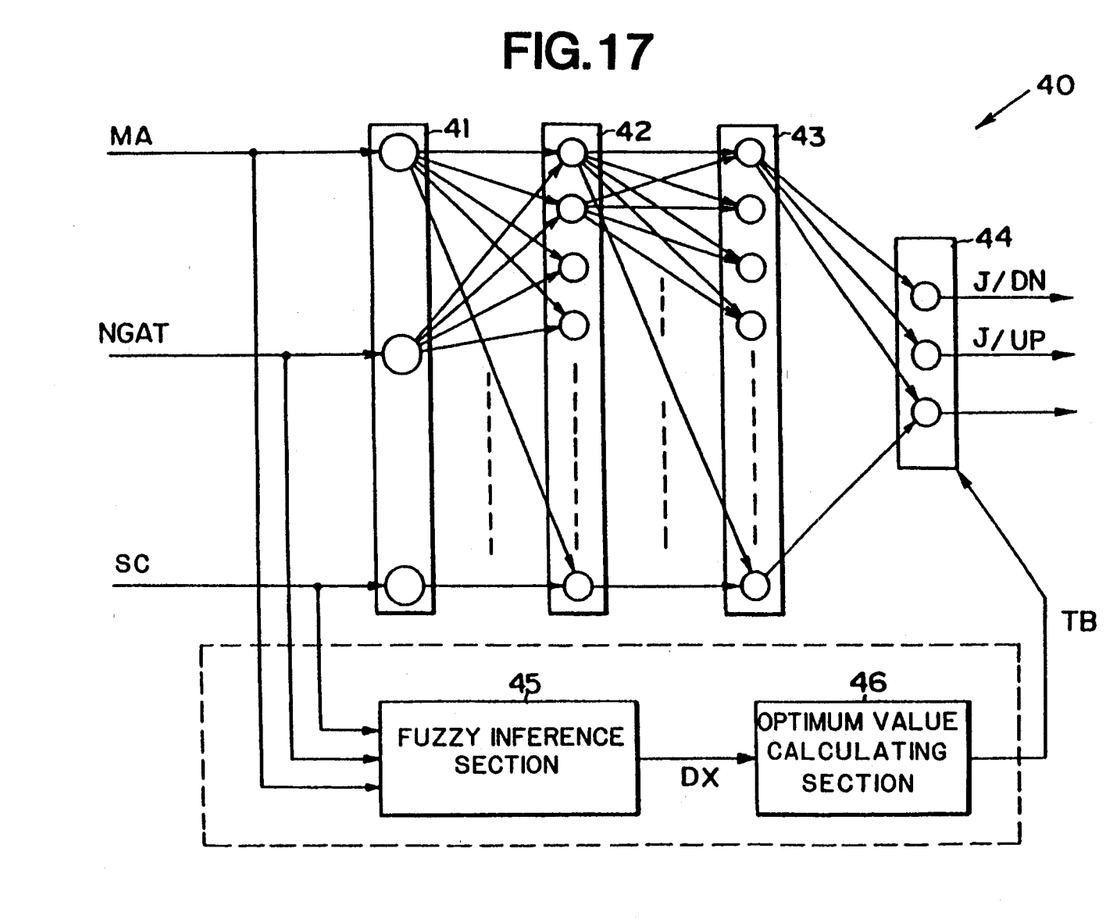
FIG. 17 illustrates an example of neural network system applicable for calculating discharge stability signal in lieu of the inference section shown in FIG. 8.

FIG. 17 illustrates an optimum value decision system 40 comprising a neural network which may be used for producing data for controlling the servo-feed action and the jump action. In this embodiment, a neural network comprising an input stratum 41, a first intermediate stratum 42, a second intermediate stratum 43, and an output stratum 44 receives signals representative of values MA, NGAT and SC from the average calculating section 18C. The signals from the average calculating section 18C are also supplied to a fuzzy inference section 45, which is equivalent to the fuzzy inference section 18E of FIG. 8. The fuzzy inference section 45 produces the discharge stability signal DX, which is transmitted to an optimum value calculator 46, which is equivalent to the optimum value calculator 15 of FIG. 1. The optimum value calculator 45 calculates optimum values for controlling the servo-feed action and the jump action according to the discharge stability signal DX, and produces a signal representative of the calculated optimum values, which is supplied to the output stratum 44 as a teaching signal TB. Back propagation may be employed as a learning tool.

According to the embodiment shown in FIG. 17, during the learning process, outputs of the neural network are held disconnected from the servo-feed and jump controllers. Each time the outputs of the fuzzy inference section 45 changes, an appropriate learning command signal is supplied to the neural network. This learning protocol is carried out repeatedly until the output of the neural network corresponds to the output of the optimum value calculator 46.

In addition, when data bases of fuzzy inference results are prepared in a storage medium, such as a ROM, the output data of the ROM may be successively supplied to the neural network for "learning" purposes.

After the learning process is complete, the neural network may be used for determining optimum values of parameters such as, for example, J/UP, J/DN and DX. Further, when an operator, based on his experience, changes the values for controlling the servo-feed action and jump action, the changed values, as teaching signals, may be supplied to the neural network as an additional step in the "learning" process.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, instead of supplying the actual value data DA obtained by a calculation in the second calculator 17 to the stability index calculator 18, the actual values may be detected in the detector 10 and the actual value data may be supplied to the stability index calculator 18 without the second calculator 17. It is intended that the scope of the invention be defined by the claims appended hereto.

We claim:

1. A method for controlling electric discharge machining in which machining pulses are applied across a machining gap formed between a tool electrode and a workpiece to thereby machine the workpiece, the gap being maintained at an essentially constant size based on a reference servo-feed voltage, said method comprising the steps of:
    determining theoretical values of characteristics for specifying machining gap conditions in accordance with predetermined machining conditions;
    detecting actual conditions existing at said machining gap during machining;
    determining actual values of said characteristics according to said detected machining gap conditions;
    generating a discharge stability signal based on said theoretical values and said actual values; and
    adjusting the reference servo-feed voltage in response to the discharge stability signal.

2. The method according to claim 1, wherein said predetermined machining conditions include machining pulse On-time, machining pulse Off-time, machining pulse no-load voltage, and said reference servo-feed voltage.

3. The method according to claim 2, wherein said first-mentioned step of determining comprises determining theoretical values of waiting time voltage, waiting time and discharge frequency.

4. The method according to claim 1, wherein said step of detecting comprises detecting, during a preset detection period, the actual number of discharges occurring, the total waiting time, and the mean gap voltage.

5. The method according to claim 4, wherein said second mentioned step of determining comprises determining waiting time voltage per machining pulse, discharge waiting time per machining pulse, and discharge frequency.

6. The method according to claim 1, wherein said step of generating a discharge stability signal comprises comparing actual and theoretical values of waiting time voltage, waiting time, and discharge frequency using fuzzy inference techniques.

7. The method according to claim 1, further comprising the steps of:
    determining a deviation ratio between said theoretical values of characteristics and said actual values of characteristics, and using said deviation rate during the step of generating said discharge stability signal.

8. A method for controlling electric discharge machining in which machining pulses are applied across a machining gap formed between a tool electrode and a workpiece to thereby machine the workpiece, the gap being maintained at an essentially constant size based on a reference servo-feed voltage and wherein, during machining the tool electrode is controlled, based on gap conditions, to execute a jump action, whereby the tool electrode is moved away from the workpiece and returned to a position close to the workpiece, said method comprising the steps of:
    determining theoretical values of characteristics for specifying machining gap conditions in accordance with predetermined machining conditions;
    detecting actual conditions existing at said machining gap during machining;
    determining actual values of said characteristics according to said detected machining gap conditions;
    generating a discharge stability signal based on said theoretical values and said actual values; and
    adjusting at least one of the reference servo-feed voltage and the conditions for executing a jump action to optimum values in response to the discharge stability signal.

9. The method according to claim 8, wherein said predetermined machining conditions include machining pulse On-time, machining pulse Off-time, machining pulse no-load voltage, and said reference servo-feed voltage.

10. The method according to claim 9, wherein said first-mentioned step of determining comprises determining theoretical values of waiting time voltage, waiting time and discharge frequency.

11. The method according to claim 8, wherein said step of detecting comprises detecting, during a preset detection period, the actual number of discharges occurring, the total waiting time, and the mean gap voltage.

12. The method according to claim 11, wherein said second mentioned step of determining comprises determining waiting time voltage per machining pulse, discharge waiting time per machining pulse, and discharge frequency.

13. The method according to claim 8, wherein said step of generating a discharge stability signal comprises comparing actual and theoretical values of waiting time voltage, waiting time, and discharge frequency using fuzzy inference techniques.

14. The method according to claim 8, further comprising the steps of:
    determining a deviation ratio between said theoretical values of characteristics and said actual values of characteristics, and using said deviation rate during the step of generating said discharge stability signal.

15. An apparatus for controlling electric discharge machining including a power pulse generator for applying machining pulses across a gap formed between a tool electrode and a workpiece to thereby machine the workpiece, a servo-feed controller for maintaining an essentially constant machining gap size based on a reference servo-feed voltage, said apparatus comprising:
    a setting device for setting machining conditions;
    a detector for detecting a condition at the machining gap and for producing detection data representative of said condition;
    a first calculator (16) for determining theoretical values of machining gap characteristics in accordance with the machining conditions set in said setting device;
    a second calculator, responsive to said detection data, for calculating actual values of said machining gap characteristics;
    a third calculator, responsive to said theoretical values and said actual values, for generating a discharge stability signal; and
    an optimum value generator for generating optimum value signals for said reference servo-feed voltage in response to said discharge stability signal.

16. The apparatus according to claim 15, wherein said optimum value generator comprises a microprocessor for processing said discharge stability signal and for generating said optimum value of servo-feed voltage.

17. The apparatus according to claim 16, wherein said microprocessor is further responsive to the set machining conditions from said setting device for generating said optimum value of servo-feed voltage.

18. The apparatus according to claim 15, wherein said third calculator comprises a comparator for comparing said theoretical values of machining gap characteristics with said actual values of said machining gap characteristics and for generating a comparison output, and a fuzzy inference means for generating said discharge stability signal in accordance with a predetermined set of rules based on said comparison output.

19. The apparatus according to claim 18, wherein said comparison output comprises a deviation ratio between said actual value of a characteristic and the theoretical value of said characteristic.

20. The apparatus according to claim 15, wherein said third calculator comprises an updatable memory for storing values of detected data, generated over a detection period, a comparator for generating a time averaged comparison, over said detection period, between said values of detected data and said theoretical values, and a fuzzy inference means for generating, based on said comparison and in accordance with a predetermined set of rules, said discharge stability signal.

21. An apparatus for controlling electric discharge machining including a power pulse generator for applying machining pulses across a gap formed between a tool electrode and a workpiece to thereby machine the workpiece, a servo-feed controller for maintaining an essentially constant machining gap size based on a reference servo-feed voltage, and a jump controller for controlling said tool electrode to execute a jump action whereby said tool electrode moves up and away from the workpiece and then returns to a position adjacent the workpiece based on set electrode jump conditions, said apparatus comprising:
    a setting device for setting machining conditions;
    a detector for detecting a condition at the machining gap and for producing detection data representative of said condition;
    a first calculator for determining theoretical values of machining gap characteristics in accordance with the machining conditions set in said setting device;
    a second calculator, responsive to said detection data, for calculating actual values of said machining gap characteristics;
    a third calculator for generating a discharge stability signal in response to said theoretical values and said actual values; and
    an optimum value generator for generating optimum value signals for said reference servo-feed voltage and said jump conditions in response to said discharge stability signal and for supplying said optimum value signals to said servo-feed controller and jump controller.

22. The apparatus according to claim 21, wherein said third calculator comprises a comparator for comparing said theoretical values of machining gap characteristics with said actual values of said machining gap characteristics and for generating a comparison output, and a fuzzy inference means for generating said discharge stability signal in accordance with a predetermined set of rules based on said comparison output.

23. The apparatus according to claim 22, wherein said comparison output comprises a deviation ratio between said actual value of a characteristic and the theoretical value of said characteristic.

24. The apparatus according to claim 21, wherein said third calculator comprises an updatable memory for storing values of detected data, generated over a detection period, a comparator for generating a time averaged comparison, over said detection period, between said values of detected data and said theoretical values, and a fuzzy inference means for generating, based on said comparison and in accordance with a predetermined set of rules, said discharge stability signal.

25. The apparatus according to claim 21, wherein said optimum value generator comprises a microprocessor for processing said discharge stability signal and for generating said optimum value of servo-feed voltage.

26. The apparatus according to claim 25, wherein said microprocessor is further responsive to the set machining conditions from said setting device for generating said optimum value of servo-feed voltage.

27. The apparatus according to claim 25, wherein said optimum value generation comprises a microprocessor for processing said discharge stability signal and for generating an optimum value of electrode jump conditions.

28. The apparatus according to claim 27, wherein said microprocessor is further responsive to a time UP signal, representative of a time during which said tool electrode is raised during a jump action, and a time DN signal, representative of a time during which said tool electrode is in a position adjacent to said workpiece, for generating said optimum value of electrode jump conditions.

* * * * *